United States Patent
de Perthuis

(10) Patent No.: US 10,223,117 B2
(45) Date of Patent: Mar. 5, 2019

(54) EXECUTION FLOW PROTECTION IN MICROCONTROLLERS

(71) Applicant: NXP B.V., Eindhoven (NL)

(72) Inventor: Hugues de Perthuis, Caen (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/852,405

(22) Filed: Sep. 11, 2015

(65) Prior Publication Data

US 2016/0077834 A1    Mar. 17, 2016

(30) Foreign Application Priority Data

Sep. 11, 2014 (EP) .................................... 14290272

(51) Int. Cl.
*G06F 9/30* (2018.01)
*G06F 9/32* (2018.01)
*G06F 9/38* (2018.01)
*G06F 21/52* (2013.01)

(52) U.S. Cl.
CPC .......... *G06F 9/30145* (2013.01); *G06F 9/321* (2013.01); *G06F 9/322* (2013.01); *G06F 9/382* (2013.01); *G06F 9/3806* (2013.01); *G06F 21/52* (2013.01)

(58) Field of Classification Search
CPC .... G06F 9/30145; G06F 9/322; G06F 9/3806; G06F 21/52; G06F 9/321
See application file for complete search history.

(56) References Cited

U.S. PATENT DOCUMENTS

| 5,604,877 A | * | 2/1997 | Hoyt | .................... G06F 9/3806 712/238 |
| 5,949,973 A | * | 9/1999 | Yarom | .................. G06F 9/4426 712/E9.083 |

(Continued)

FOREIGN PATENT DOCUMENTS

| CN | 201364577 Y | 12/2009 |
| DE | 10252347 A1 | 5/2004 |

(Continued)

OTHER PUBLICATIONS

European Search Report in EP Application No. 14290272,, dated Mar. 11, 2015.

(Continued)

*Primary Examiner* — Joseph P Hirl
*Assistant Examiner* — J. Brant Murphy

(57) ABSTRACT

An execution flow protection module (30) for a microcontroller (10) with a memory (24) and a microprocessor (20) is described. The module (30) is configured to monitor the memory (24) access of the microcontroller (10) to identify instructions fetched by the microcontroller (10) from the memory (24) for execution by the microprocessor (20). The module (30) comprises an instruction decoder unit (32) for determining a program counter value associated with the execution flow of the instructions fetched by the microcontroller (10); a program counter predictor unit (34) for predicting the program counter value of the next fetched instruction; and an interrupt module (40) for responding if the next instruction fetched by the microcontroller does not match the predicted program counter value.

18 Claims, 2 Drawing Sheets

(56) References Cited

U.S. PATENT DOCUMENTS

| | | | | |
|---|---|---|---|---|
| 6,941,473 B2* | 9/2005 | Etoh | G06F 21/52 | 712/E9.083 |
| 6,971,019 B1* | 11/2005 | Nachenberg | G06F 21/564 | 713/187 |
| 7,272,748 B1* | 9/2007 | Conover | G06F 11/1407 | 712/233 |
| 7,581,089 B1* | 8/2009 | White | G06F 9/4426 | 712/242 |
| 7,603,704 B2* | 10/2009 | Bruening | G06F 21/52 | 726/22 |
| 7,650,640 B1* | 1/2010 | Levy | G06F 21/52 | 726/23 |
| 7,853,803 B2* | 12/2010 | Milliken | G06F 21/52 | 713/176 |
| 7,886,148 B2* | 2/2011 | Kiriansky | G06F 21/53 | 713/166 |
| 8,161,293 B2 | 4/2012 | Teglia et al. | | |
| 8,359,450 B2* | 1/2013 | Crosby | G06F 9/5016 | 711/170 |
| 9,256,730 B2* | 2/2016 | Wicherski | G06F 21/52 | |
| 2002/0157000 A1* | 10/2002 | Hay | G06F 9/3806 | 712/239 |
| 2003/0088862 A1* | 5/2003 | Ramasamy | G06F 9/30054 | 717/158 |
| 2004/0003207 A1* | 1/2004 | Sunayama | G06F 9/321 | 712/218 |
| 2004/0143727 A1* | 7/2004 | McDonald | G06F 9/3806 | 712/228 |
| 2004/0168078 A1* | 8/2004 | Brodley | G06F 21/52 | 713/190 |
| 2005/0183990 A1 | 8/2005 | Gail et al. | | |
| 2006/0026408 A1* | 2/2006 | Morris | G06F 9/3846 | 712/239 |
| 2007/0101110 A1* | 5/2007 | Kishore | G06F 9/3017 | 712/239 |
| 2007/0174912 A1* | 7/2007 | Kraemer | G06F 21/552 | 726/23 |
| 2007/0180524 A1* | 8/2007 | Choi | G06F 21/52 | 726/23 |
| 2008/0022405 A1* | 1/2008 | Wang | H04L 63/1441 | 726/23 |
| 2009/0089564 A1* | 4/2009 | Brickell | G06F 9/30003 | 712/239 |
| 2009/0320129 A1* | 12/2009 | Pan | G06F 21/54 | 726/22 |
| 2010/0011209 A1* | 1/2010 | Kiriansky | G06F 21/554 | 713/166 |
| 2010/0125909 A1 | 5/2010 | Dai et al. | | |
| 2010/0169626 A1* | 7/2010 | Wang | G06F 9/3806 | 712/239 |
| 2010/0180159 A1* | 7/2010 | Bittles | G06F 11/3636 | 714/38.1 |
| 2011/0067104 A1 | 3/2011 | Goncalves et al. | | |
| 2011/0072418 A1* | 3/2011 | Kalamegham | G06F 11/3636 | 717/128 |
| 2011/0252132 A1* | 10/2011 | Wetzer | G06F 9/542 | 709/224 |
| 2012/0066698 A1 | 3/2012 | Yanoo | | |
| 2012/0079283 A1* | 3/2012 | Hashimoto | G06F 12/1425 | 713/189 |
| 2012/0185714 A1* | 7/2012 | Chung | G06F 1/3203 | 713/323 |
| 2013/0024937 A1* | 1/2013 | Glew | G06F 21/577 | 726/23 |
| 2013/0031364 A1* | 1/2013 | Glew | G06F 21/72 | 713/162 |
| 2013/0117843 A1* | 5/2013 | Komaromy | G06F 21/52 | 726/22 |
| 2013/0185792 A1* | 7/2013 | Balakrishnan | G06F 21/54 | 726/22 |
| 2014/0075556 A1* | 3/2014 | Wicherski | G06F 21/554 | 726/23 |
| 2015/0268961 A1* | 9/2015 | Zuraski | G06F 9/3806 | 712/207 |

FOREIGN PATENT DOCUMENTS

| | | |
|---|---|---|
| EP | 2 426 618 A1 | 4/2010 |
| WO | WO-2007/042478 A1 | 4/2007 |

OTHER PUBLICATIONS

"ARM7TDMI—Revision r4p1—Technical Reference Manual", ARM, 286 pgs, retrieved from the internet Oct. 8, 2018 at: http://infocenter.arm.com/help/topic/com.arm.doc.ddi0210c/DDI0210B.pdf (2001).

"Cortex—M0 Devices—Generic User Guide", ARM, 140 pgs., retrieve from the Internet Oct. 8, 2018 at: http://infocenter.arm.com/help/topic/com.arm.doc.dui0497a/DUI0497A_cortex_m0_r0p0_generic_ug.pdf (2009).

Yiu, J. "The Definitive Guide to ARM Cortex-M0 and Cortex-M0+ Processors—Second Edition", Elsevier Inc., 668 pgs. retrieved from the internet Oct. 8, 2018 at: http://infocenter.arm.com/help/topic/com.arm.doc.ddi0210c/DDI0210B.pdf (2015) (Document split into seven PDF documents to comply with EFS web filing size, a total of 668 pgs).

* cited by examiner

EXECUTION FLOW PROTECTION IN MICROCONTROLLERS

CROSS-REFERENCE TO RELATED APPLICATIONS

This application claims the priority under 35 U.S.C. § 119 of European patent application no. 14290272.5, filed on Sep. 11, 2014, the contents of which are incorporated by reference herein.

FIELD

The disclosure describes an execution flow protection module for a microcontroller and a method and an integrated circuit for ensuring the integrity of execution flow in a microcontroller. In particular, the disclosure describes a module that in parallel to a microcontroller predicts a program counter value of a next fetched instruction and compares the computation with the next instruction access of the microcontroller to ensure the integrity of the execution flow.

BACKGROUND

Many electronic devices are single die integrated circuits, where a microcontroller, e.g. an Advanced RISC Machine (ARM) or 8051 (Intel MCS-51) core, controls multiple peripherals such as a serial link, general-purpose input/output (GPIO) or other device. The microcontroller data and code are stored in internal memories of the microcontroller, e.g. flash, Electrically Erasable Programmable Read-Only Memory (EEPROM), Read Only Memory (ROM) or other suitable memory.

Some of these devices are used in applications where security is important, for example in transactions such as money transfers or in power meters or credit cards. It is important to ensure that the execution flow of the program in such cases is not modified by an attacker.

Such microcontroller devices operate on an input using a stored program and stored data to produce an output. The program has executable instructions that are executed by the microcontroller in a dictated order, with the content of registers pushed and popped to a last-in-first-out structure, such as a stack, for efficient computation. A program counter (PC) is used to indicate the address or another value representative of the next instruction to be fetched or executed. The PC is a register of the microcontroller. For example, in a Cortex M0 core it is the R15 register. The PC is automatically incremented by the microcontroller hardware or pushed/popped from the memory stack by a specific instruction, such as a call subfunction, dependent upon the decode instruction. Typically, after each instruction is executed, the PC is updated by the microcontroller to point to the next instruction (for example, the address of the next instruction).

One way in which an attacker could compromise the system could be by trying to skip lines of code (such as a line checking whether the correct PIN code has been entered) by inserting a fault at the correct time. Faults may be introduced using multiple light pulses or power spikes. Alternatively, an attacker could take advantage of software bugs, so that, via a. buffer overflow, code is inserted or a return oriented programming (ROP) attack is executed. A non-exhaustive list of assets which can be manipulated to disrupt execution flow include a microprocessor, the PC value, a status bit, the register content (for example modifying a loop counter or an address), an instruction operand and an Arithmetic Logic Unit (ALU) computation. Additionally, the computation stack may be manipulated, for example by altering a variable stored in the stack or the return address in the stack. Finally, other areas may be attacked, such as the content of the processor register.

As these attacks can be generated in many ways, for example by voltage or clock glitches, low or high temperatures, laser pulses, or by logical means such as buffer overflows, and in many parts of the integrated circuit, it is difficult to protect against all of them.

To protect against execution flow manipulation, what is usually done is to perform, in parallel to normal processing, some additional computation. The result of this computation can then be checked and cross-referenced, the idea being that it would be difficult for an attacker to simultaneously modify two parallel processes. For instance, to ensure that critical loops are executed the correct number of times, an additional counter can be used to cheek the loop counter during and after the loop.

| | |
|---|---|
| 1. | loopCount = 0; |
| 2. | for (i=0; i<length; i++){ |
| 3. | do something; |
| 4. | if (loopCount != i){ {throw error}; |
| 5. | loopCount++; |
| 6. | } |
| 7. | if (loopCount != (length−1)){throw error}; |

Drawbacks of protecting against disruption of the execution program flow in the software itself are that this impacts system performance because the executed code will grow in size as the same operations are performed multiple times, so it cannot be systematic. Additionally, development time in increased as the additional code must be inserted and tested.

Moreover, such code is vulnerable to the same attacks as the code it protects. The method therefore in effect relies on the hope that the attacker will not have enough 'bullets'.

The present disclosure aims to alleviate these issues by providing a hardware unit that checks the execution flow in real time and flags if the execution flow has been compromised.

SUMMARY

According to a first aspect of the invention, there is provided an execution flow protection module for a microcontroller with a memory and a microprocessor, said module configured to monitor the memory access of the microcontroller to identify instructions fetched by the microcontroller from the memory for execution by the microprocessor, said module comprising:

an instruction decoder unit for determining a program counter value of the instructions fetched by the microcontroller;

a program counter predictor unit for predicting the next program counter value of a next instruction to be fetched; and an interrupt module for responding if the next instruction fetched by the microcontroller does not match the predicted next program counter value.

The interrupt module may compare the program counter value of the next instruction fetched by the microcontroller as determined by the instruction decoder with the predicted program counter value and provide a response if these two values do not match. Alternatively, the module may use the program counter value predicted by the program counter predictor unit to predict the next instruction to be fetched by the microcontroller and this predicted next instruction may be compared with the actual next instruction by the interrupt module to determine if they match.

The first aspect provides a dedicated module that may be provided at a different location to the main microprocessor to provide increased resilience against attacks on the execution flow of both the microprocessor and the execution flow protection module. Additionally, by providing a separate hardware unit the drawbacks associated with a software solution can be overcome. Additionally, by providing a separate module which only examines the execution flow, rather than duplicating the entire program or instructions executed by the main microprocessor, the cost in die area is minimized as compared to providing a duplicate microprocessor.

The instruction decoder unit may be considered a partial instruction decoder unit due to its ability to decode the program counter value associated with the execution flow of the instructions fetched by the microcontroller.

At least one last-in-first-out structure may be provided for storing the program counter value, such as during subfunction calls. The last-in-first-out structure may be a stack. Subfunction calls refer to execution instructions that are non-linear and so do not have a linear progression of the program counter value.

Examples of the response by the interrupt module include generating an alert, stopping the device, or providing an incorrect parameter to another module or unit.

In examples, the program counter value can be a return address of the executed instruction. This is the case if the execution flow is non-linear, such as for subfunction calls. Due to the execution flow structure, each non-linear instruction provides a return address as a program counter value to the microprocessor, which is stored in the last-in-first-out structure, such as a stack pointer. By analyzing the execution flow, the value of the return address of the present instruction can be determined. Additionally, the expected or predicted return address of the next fetched instruction can be determined based on the execution flow of instructions. Using the addresses of the present instruction and the predicted instruction allow a comparison to be made to ensure that the address of the present instruction correctly matches the expected address predicted from the previous instruction.

A register may be provided for receiving a hint of the execution flow of the next instruction to be fetched by the microcontroller. Hints may be provided by the instructions executed by the microprocessor. Utilizing hints allows the module to determine the program counter value in instances where the expected progression of the program counter value is non-linear, for example in loop commands, call commands, if, then, else commands or other conditional branches in the execution flow of instructions. In such examples, the program counter predictor unit may predict the program counter value based on the hint. For example, if the execution flow of instructions indicates that a branch is required, the hint may take the form of a counter initialized in the module. Each time the branch is taken, this counter will be decremented. If the counter has not reached zero when the branch is not taken, an error will be detected.

The hint may be provided as an instruction to the register. As noted above, the instruction to the register may be representative of the execution flow of the next instruction fetched, such as a loop or a call function. Hint instructions could be more or less complex. In previous examples only static values are described, but more complex ones could be used, such as to cover loops where the number of iterations is known only at execution time. There are also more complex cases, where multiple branches can occur or are embedded. In such cases, hints could be given by the software to the module via register writes.

Exemplary hints can include:
Counter n must be manipulated:
  a. set to value x; or
  b. increment/decrement x
Counter a value must be checked:
  a. When next branch is skipped;
  b. When a branch is taken; or
  c. Immediately
Counter n value must be equal to:
  a. X; or
  b. 0
Counter a will be decremented:
  a. every time next branch is taken; or
  b. every time a branch is taken Accordingly, using the hints, the program counter predictor unit can predict the program counter value based on the instruction provided to the register. This allows a comparison to be made between the predicted program counter value and the determined program counter value for non-linear execution paths. Additionally, the program counter predictor unit may predict more than one predicted program counter value if the hint suggests that the value of the program counter value is dependent on execution code or information that is not available to the module. For example, conditional FOR loops that depend on the value of a register not accessible by the module may require multiple predicted values to be calculated dependent upon the possible values of the register.

As noted above, embodiments can require that the instruction decoder unit determines the program counter value of the expected next instruction.

The execution flow may be one or more of: linear flow; loops such as while or FOR loops; conditional statements such as an if-then-else or switch function; a function call; manipulation of stack elements, or any other programming language structure. For example, other execution flow parameters be used, however it is appreciated that as the possible number of execution flow parameters increases, the computational requirement of the module also increases.

If the execution flow is linear flow such that instructions are executed linearly, then the predicted program counter value can be the address of the next instruction. The module can parse instructions and the instruction decoder unit can detect that the instructions are not a branch and that the program counter value will be incremented.

If the execution flow is not linear flow but a conditional branch, such as during a subfunction call, then the program counter value may be either incremented or modified with an offset or some other means. In this instance, the instruction decoder unit cannot check the value of the status bit of the register called and therefore the program counter predictor unit computes both or all of the alternative program counter values, such as the return address value of the next instruction, that are possible.

One or more additional last-in-first-out structures may also be provided. These additional last-in-first-out structures may each handle different modes or contexts of the microcontroller and/or provide and receive program counter values when a function call or return is detected by the instruction. As an example, an additional last-in-first-out structure such as a main stack pointer may be included in the module for providing and receiving program counter values when a function call or return is detected by the instruction decoder. This prevents costly stack pointer manipulation each time an operating system switches tasks. When the operating system switches to a new task, its interrupt handler will also save the stack pointer values and register stored in the module for the previous task. This is referred to as a context of the microcontroller. Upon switching to the new task, the handler restores the context, i.e. the stack pointer value and register, of the next task. The additional last-in-first-out structures operate in a similar manner. The return address of the different functions and other data, such as the different counters setup by the hints, may also be retrieved. This means that there will be no need to handle overflows and underflows in the main microcontroller hardware and software. Similar considerations are required if the microcontroller enters a different mode such as an addressing mode. In this instance, it tray be required to push values and registers to the last-in-first-out structure before leaving a mode, and to retrieve relevant values and registers for the new mode.

According to a second aspect, there is provided a method for ensuring the integrity of execution flow in a microcontroller with a memory and a microprocessor, said method comprising the steps of:

determining the instructions fetched by the microprocessor from the memory;

analyzing the expected execution flow of the instructions fetched;

obtaining a value associated with the current instruction;

modifying the value according to the expected execution flow;

obtaining an updated value associated with the next instruction comparing the modified value to the updated value; and generating a response if the modified value does not match the updated value.

It can be appreciated that the features and functionality described with respect to the first aspect may be applied to the second aspect. In particular, appropriate responses may include an interrupt, stopping the device or providing an incorrect parameter to another unit of the microcontroller or module.

According to a third aspect of the present disclosure, there is provided an integrated circuit comprising: a microprocessor; a memory controller; a memory; and an execution flow protection module according to the first aspect.

According to a fourth aspect of the present disclosure there is provided a secure device comprising a microcontroller according to the third aspect. The device may be a smart card.

In a general aspect, the proposal is to have a hardware module which in real time checks that execution flow is correctly executed. In order to achieve this as efficient as possible, i.e. without duplicating the execution flow and instruction set, a minimal set is used which will perform in parallel to the microcontroller the same instruction decoding, so that it can compute the address of the next instruction to be decoded.

If the next fetched instruction does not match the expected fetched instruction, the execution flow protection unit can either stop the processing, or generate an exception.

Another option is to use the result of the computation described above to provide a counter value used for encryption. For example, the predicted value of the program counter may be used as an input for decryption or encryption. Such an approach would be difficult for an attacker to bypass.

In the above described aspects, the module may be configured to read the memory of the microcontroller via a memory bus to identify instructions fetched by the microcontroller from the memory bus.

As this process will be performed in hardware at a different location from the main microprocessor and microcontroller, it will be much more difficult for an attacker to compromise both the microcontroller and the execution flow protection unit.

These and other aspects of the invention will be apparent from and elucidated with reference to, the embodiments described hereinafter.

BRIEF DESCRIPTION OF DRAWINGS

The disclosure will now be described with reference to the following figures in which like reference numerals are used to denote like elements.

Figure 1:
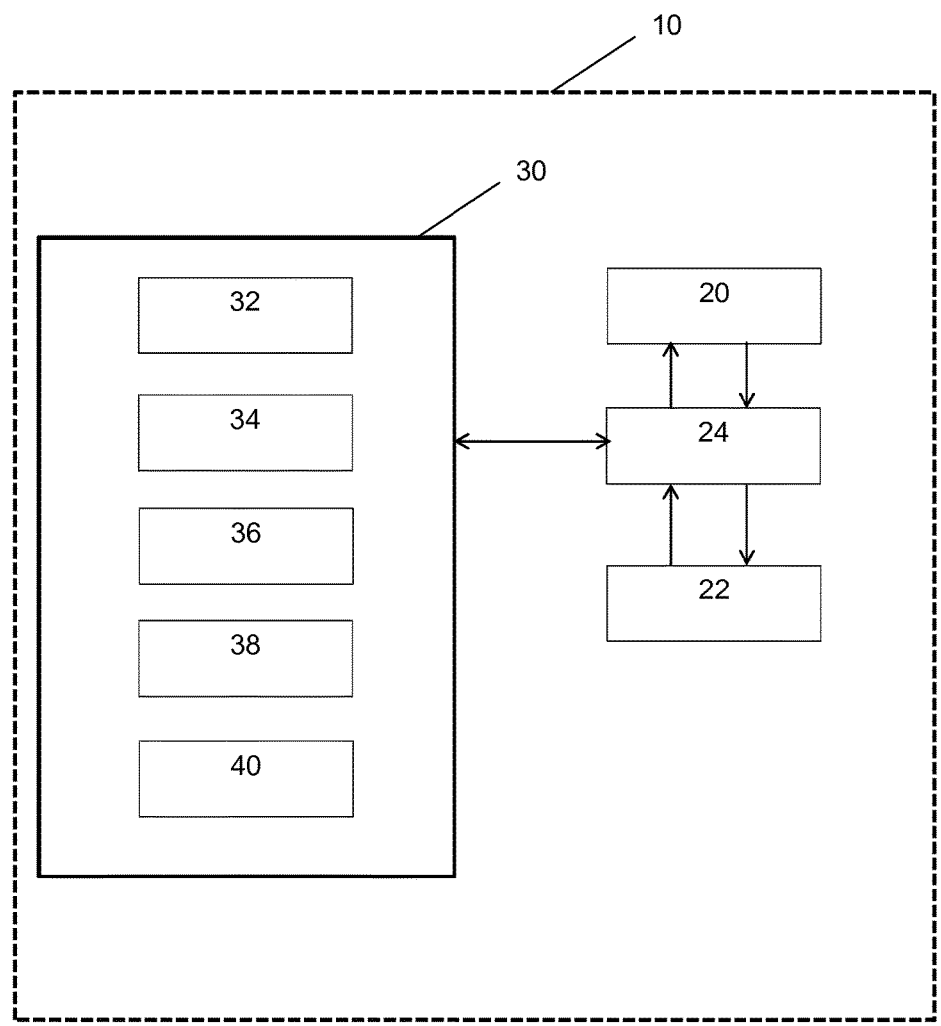
FIG. 1 is a block diagram of microcontroller with an execution flow protection module according to the present disclosure.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION

FIG. 1 shows a microcontroller 10 with a processor 20, memory 22 and memory bus 24. The processor 20 is configured to execute instructions provided by the memory bus 24 and to request functions stored in the memory 22 via the memory bus 24.

Within the microcontroller, in communication with the memory bus 24, is an execution flow protection module 30. The module 30 comprises a number of units including an instruction decoder 32, program counter predictor 34, process stack pointer 36, main stack pointer 38 and interrupt module 40.

The instruction decoder 32 is configured to read or parse at least partly the instructions provided to the microprocessor 20 and the program counter value (such as return address locations) of functions requested or fetched by and to the microprocessor 20 via the memory bus 24. The decoder 32 is able to recognize linear execution or branching execution from the instructions.

Based on the instructions determined by the instruction decoder 32, the program counter predictor 34 can predict the next program counter value (or, in the case of branching execution instructions, the different alternative counter values).

The process stack pointer 36 provides a stack in which the program counter values may be swapped in and out as tasks are called by the instruction decoder. Such stack is a first-in-last-out structure. When an instruction to modify the program counter is recognized by the instruction decoder 32 and a predicted program counter value generated by the program counter predictor 34, the program counter value will be pushed into this stack and popped at a return time. For example, if a function call instruction is recognized, the return address will be pushed in this stack and popped at return time. In case of overflow, an interrupt will be generated so that its content can be saved. The depth of the stack is configured such as to minimize this event. When a return instruction is detected, the last value will be popped and used for next checks. In case of an underflow, an interrupt will be generated to refill the stack.

The main stack pointer 38 is a second last-in-first-out structure, in this case a stack that is used by the operating system and allows for storing of the process stack pointer if the operating system changes the task being executed. This allows the previous task to be recalled restoring the information stored within the process stack pointer 36 relevant to the task being executed and the progress of the task being executed.

An interrupt module 40 is provided to compare the program counter value determined by the instruction decoder 32 with the program counter value predicted by the program counter predictor 34. The interrupt module may receive the values directly from the units 32, 34 or it may pop them from the process stack pointer 36.

The interrupt module 40 is also provided to generate an interrupt request when the number of return addresses or program counter values stored in the process stack pointer 36 overflows or underflows, or when an integrity error occurs.

Predicting the program counter value is achieved as outlined below with respect to Table 1.

Using as an example, a simple loop:

| 1 | Sum = 0; |
| 2 | for (i=0; i<4; i++) Sum +=i; |
| 3 | ... |

This loop will translate in assemble (ASM) to:

| 1. | MOVS R0, #0 ; Sum = 0 |
| 2. | MOVS R1, #0   ; i=0 |

-continued

| 3. | loop |
| 4. | ADDS R0, R0, R1 ; Sum +=i |
| 5. | ADDS R1, R1, #1 ; i++ |
| 6. | CMP R1, #4 ; Compare i to 4 |
| 7. | BLT loop         ; if less than then branch to loop |
| 8. | ... |

It can be seen that ASM line 4 can be reached either from line 2 when code is executing linearly or from line 7 when the loop has still to be completed. Other use cases, such as nested loops, switches, etc. exist where a label will be reached from multiple locations, so the simple proposal of using the previous address to check the execution flow integrity will not work.

For an Advanced RISC Machine (ARM) core, only a limited number of instructions can result in non-linear execution, as shown in Table 1.

TABLE 1

An instruction set operable to be executed by the ARM cortex M0 microcontroller of FIG. 1

| | Format | 15 | 14 | 13 | 12 | 11 | 10 | 9 | 8 | 7 | 6 | 5 4 3 | 2 1 0 |
|---|---|---|---|---|---|---|---|---|---|---|---|---|---|
| Move shifted register | 01 | 0 | 0 | 0 | Op | | | Offset5 | | | | Rs | Rd |
| Add and subtract | 02 | 0 | 0 | 0 | 1 | 1 | 1 | Op | Rn/offset3 | | | Rs | Rd |
| Move, compare, add, and subtract immediate | 03 | 0 | 0 | 1 | Op | | Rd | | | | | Offset8 | |
| ALU operation | 04 | 0 | 1 | 0 | 0 | 0 | 0 | Op | | | | Rs | Rd |
| High register operations and branch exchange | 05 | 0 | 1 | 0 | 0 | 0 | 1 | Op | H1 | H2 | | Rs/Hs | RdHd |
| PC-relative load | 06 | 0 | 1 | 0 | 0 | 1 | Rd | | | | | Word8 | |
| Load and store with relative offset | 07 | 0 | 1 | 0 | 1 | L | B | 0 | | Ro | | Rb | Rd |
| Load and store sign-extended byte and halfword | 08 | 0 | 1 | 0 | 1 | H | S | 1 | | Ro | | Rb | Rd |
| Load and store with immediate offset | 09 | 0 | 1 | 1 | B | L | | Offset5 | | | | Rb | Rd |
| Load and store halfword | 10 | 1 | 0 | 0 | 0 | L | | Offset5 | | | | Rb | Rd |
| SP-relative load and store | 11 | 1 | 0 | 0 | 1 | L | Rd | | | | | Word8 | |
| Load address | 12 | 1 | 0 | 1 | 0 | SP | Rd | | | | | Word8 | |
| Add offset to stack pointer | 13 | 1 | 0 | 1 | 1 | 0 | 0 | 0 | 0 | S | | SWord7 | |
| Push and pop registers | 14 | 1 | 0 | 1 | 1 | L | 1 | 0 | R | | | Rlist | |
| Multiple load and store | 15 | 1 | 1 | 0 | 0 | L | Rb | | | | | Rlist | |
| Conditional branch | 16 | 1 | 1 | 0 | 1 | | Cond | | | | | Softset8 | |
| Software interrupt | 17 | 1 | 1 | 0 | 1 | 1 | 1 | 1 | | | | Value8 | |
| Unconditional branch | 18 | 1 | 1 | 1 | 0 | 0 | | | | | | Offset11 | |
| Long branch with link | 19 | 1 | 1 | 1 | 1 | H | | | | | | Offset | |
| | Format | 15 | 14 | 13 | 12 | 11 | 10 | 9 | 8 | 7 | 6 | 5 4 3 | 2 1 0 |

These instructions can be divided into the following groups:

Branches where offset is part of instruction, such as:
B{cond} label, i.e., format 16, with a jump of −256 to +254 bytes;
B label, i.e. format 18, with a jump of +/−2 KB;
a branch link label, i.e. format 19 (repeated), with a jump of −/−16 MB.

Branches where a register is used to indicate the next instruction address, such as:
Branch return and branch link return, i.e. format 5;

Branches where a memory location is used to indicate the next instruction address, such as:
POP, i.e. format 14, where the return address saved in the stack is pushed back to the program counter value.

It should be noted that instructions with link options, i.e. branch link and branch link return, are used to call functions as they save the next program counter value to a link register whereas POP {PC} and branch return are used to return from calls as they branch to return addresses saved in the process stack 36 or link register.

Another grouping can be:
1. Instructions where it is possible to compute the next address, i.e. instructions without a branch or an unconditional branch;
2. Instructions where it is possible to compute an alternative address, e.g. a conditional branch where we know the program counter value will be either incremented or a value computed from instructions;
    a. One problem with this grouping is that if a status bit stored in a link register is wrong, it might not execute a loop completely or it may take the wrong path.
3. Instructions where it is possible to guess the address, (but this might be complex), e.g. instructions where the program counter value is saved in a link register or on the process stack 36 and later returned by a branch return or a POP. Note that in one direction, it might be easy to guess an address, but attempting to guess the address in a return flow direction might be more difficult;
    a. One problem with this grouping is that there is a potential of buffer overflow or ROP attacks.
4. Instructions where there is no way to guess the program counter value, such as the return address, because information is stored in a CPU register, e.g. branch return and branch link return;
    a. One problem with this grouping is that it is susceptible to a ROP type of attack or simply at risk of fault insertion where registers are modified.

It should be noted that only a few of the leading bits needs to be parsed to detect which instruction is being decoded. For each of these groups protection is proposed as outlined below.

Instructions Group 1

Here, the execution flow protection module 30 can parse instructions and detect that the instruction is not a branch and that the value of the program counter will be incremented. Alternatively, the module can detect that the instruction is an unconditional branch without a link where we can compute the next program counter value.

Instructions Group 2

Here, a conditional branch is necessary, so the program counter value will be either incremented or modified with an offset. What cannot be checked is the status bit, so the module 30, via the program counter predictor 34, computes the two possible addresses and then checks that one of them is taken using the interrupt module 40.

To secure a sensitive loop so that the correct number of iterations is performed, code may be used to provide a hint to the module 30. For example, a write to a register of the module 30 to initialize a counter may be hinted. In this case, each time a branch is taken, this counter will be decremented. If the counter has not reached 0 when the branch is not taken, then an error will be detected by the interrupt module 40.

For instance to ensure that a loop is executed 16 times

| 1 | looprogram counterount = 0; |
|---|---|
| 2 | Init_XFPU_branch_counter_register(16); // Simple AHB write |
| 3 | for (i=0; i<16; i++){ |
| 4 | do something; |
| 5 | } |
| 6 | Do something |

In the ASM, line 3 will result in a branch being taken 16 times. The counter initialized in line 2 will decrement each time the branch is taken.

Hint instructions could be more or less complex. For example, the previous examples only cover static values, but more complex ones, such as to cover loops whose number of iterations is known only at execution time, may be used.

There are also other complex cases, where multiple branches can occur or are embedded. In a similar manner to what is done in software, hints could be given by the software to the module 30 via register writes. As writes to module 30 registers are themselves protected due to linear execution, it will be difficult to bypass them.

Different hints could be made with a combination of different conditions, for example;
1. Counter n must be manipulated:
    a. set to value x; or
    b. increment/decremented of x
2. Counter n value must be checked:
    a. When next branch is skipped;
    b. When a branch is taken; or
    c. Immediately
3. Counter n value must be equal to:
    a. X; or
    b. 0
4. Counter n will be decremented:
    a. every time next branch is taken; or
    b. every time a branch is taken For instance, in the previous example, we would have had condition 1a 2a, 3b and 4a.

Instructions Group 3 and 4

This group includes mainly function calls, including software interrupts, and returns. Typical cases involve the use of the different link, exchange and stack operations. In real code, multiple successive nested calls may be implemented.

It may be necessary to add to this group the instructions of Group 1 such as MOV if its destination is R15, i.e. the Program Counter. However, this is an unusual occurrence as generally a branch return subfunction is used for this purpose. It is also possible that a pre-processing step could ensure that the program counter value is not manipulated directly, but only via branch and link instructions.

To be able to check execution flow, it is necessary to keep track of the return address so that the return address can be used to verify that the correct call subfunction has been called and also to check that the link address is correct when going forward.

What can be done is to have a memory to save the return address in the module 30. When a link function (such as a branch link or branch link return) is recognized by the instruction decoder 32, the next program counter will be predicted by the program counter predictor 34 and saved in the parallel process stack 34. When a branch return or a POP {PC} is recognized then a check is made that the new value of the program counter matches with the expected value. As there can be multiple nested calls functions, it is desirable to use benchmarking tools (such as the one part of ARM Development Studio 5) to find the optimal depth at which program counter values must be predicted.

The interrupt module 40 also ensures that in case of overflow, the stack content can be saved to memory. The stack content will also be required to support context switches of real time operating systems.

Saving the program counter value, such as the return address does not protect against attacks where an address in a register is modified to call a critical function. To ensure that critical functions are called by the correct code, in a software only solution, one technique utilizes a function to check that a variable which cannot be easily guessed has been correctly set by the calling code, as shown below.

```
1       int *magicByte = get_rand( );
2       ...
3       func1(*magicbyte);                    // call function
4
5       void func1(int canaryvalue){
6           if (canaryvalue != *magicbyte) {throw error}
7           else {magicbyte = get_rand( ); // Destroy value
8       };
9           ...
```

This code protects against an attacker which can modify the call stack or program counter, but for which it is more difficult to access the memory to retrieve a value and then to push it on the stack.

In the present disclosure, a first hint can be used to set the canary value and a second hint to enable the module to perform the comparison. The advantage compared to a software only solution is that the comparison check will be performed in hardware and cannot be skipped.

If there is no hint given to the module 30, then it will have to accept any branching. In this case, one option would be to either make hinting of a function call mandatory for all the firmware or at least part of it, such as for critical functions.

Software interrupts are just a specific function call. For hardware interrupts, detecting interrupts to synchronize to them might be difficult as some interrupts are internally generated, such as an invalid instruction, address, etc., and also the timing of decoding might be approximate, for example in the case of nested interrupts. One solution is to detect access to a vector table, and assume that access to this table is authorized, and therefore to save the next program counter value as in a case of a normal function jump. Depending on whether the vector table is stored in flash or Static Random Access Memory (SRAM), the implementation will vary.

This might potentially be an attack vector. By modifying a vector value, an attacker will be able to execute any code. Accordingly, the vector table has to be protected against tampering. For instance, if the vector tables are stored in SRAM, they should be accessible only at specific execution points and only available to be read once the tables have been written.

Depending on the overhead, the module can support in hardware two different last-in-first-out structures, such as stacks 36, 38. When the operating system switches to a new task, the interrupt handler also saves the context stored in the process stack 36 of the previous task and restores the context of the next task. In the present disclosure, the return address of the different functions and other data such as the different counters setup by the hints is restored. For the operating system, no save and restore is necessary because of operating system file-in-file-out structures in the module 30. Note that the implementation of this example might be easier because the depth required can be known in advance and will be quite shallow, because the operating system is optimized for low overheads, e.g. it does not have recursive calls. This means that there will be no need to handle overflows and underflows in hardware and software.

Hints can be passed via register writes to the module 30. To reduce the overhead of register writes, which can take several cycles for some instructions, it is possible to use the address most significant bit to transfer settings to the module 30. Typically, addresses are 32 bits wide, whereas for memory controllers, the address range is much more limited.

Figure 2:
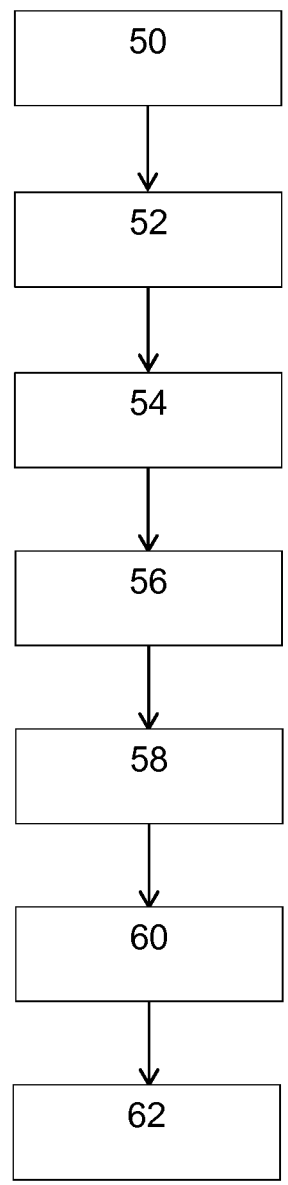
FIG. 2 is a flowchart of steps operable to be executed by the execution flow protection module of FIG. 1.

An overview of the method steps undertaken by the module 30 to ensure the integrity of execution flow in a microcontroller with a memory bus and a microprocessor is shown in FIG. 2. The method defines a step of determining 50 the instructions fetched by a microprocessor from the memory bus. The instructions may be linear or non-linear instructions as described above. The instructions are then analyzed 52 to determine the expected execution flow of the possible next instructions to be fetched. Based on this analysis, a. value is obtained 54 that is associated with the current instruction. As described above, the value may be the return address of the program counter.

This value is stored, for example in a last-in-first-our structure, in this case a stack, such as a process stack, with an associated process stack pointer that allows the value to be obtained from the stack. Based on the expected execution flow, the value is when modified 56 accordingly. For example, for linear execution flow, the value may be incremented. For non-linear execution flow, the value may be determined using hints or other means as described above.

An updated value is then obtained 58 that is based or associated with the next instruction. For example, f the original value is the return address of the current instruction, the modified value will be the expected return address of the next instruction. The updated value obtained will then be the actual return address of the next instruction.

The modified value is then compared 60 to the updated value. If the modified value does not match the updated value, an alert is generated 62. The alert may be a warning to a user, or it may be an error.

This invention can be applied to an integrated circuit based around a microcontroller controlling multiple peripherals and where the applications require some security (for example because money is involved), e.g. a microcontroller used for a power meter or in secure elements such as smart cards, etc.

From reading the present disclosure, other variations and modifications will be apparent to the skilled person. Such variations and modifications may involve equivalent and other features which are already known in the art of cryptography and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfill the functions of several means recited in the claims and reference signs in the claims shall not be construed as limiting the scope of the claims.

The invention claimed is:

1. A method for ensuring integrity of an execution flow in a microcontroller with a memory and a microprocessor, said method comprising:

determining, in an execution flow protection module in parallel to the microcontroller, instructions fetched by the microprocessor from the memory;

analyzing, in the execution flow protection module, an expected execution flow of the fetched instructions;

obtaining, in the execution flow protection module, a value associated with a current instruction;

modifying, in the execution flow protection module, the value according to the expected execution flow;

obtaining, in the execution flow protection module, an updated value associated with a next instruction;

comparing, in the execution flow protection module, the modified value to the updated value; and generating, in the execution flow protection module, a response when the modified value does not match the updated value, wherein the comparison of the modified to the updated value is performed in hardware at a different location from a main microprocessor and the microcontroller.

2. An execution flow protection module for a microcontroller with a memory and a microprocessor, said execution flow protection module configured to monitor memory access of the microcontroller in parallel to the microcontroller to identify instructions fetched by the microcontroller from the memory for execution by the microprocessor, said execution flow protection module comprising:

an instruction decoder unit configured to determine a program counter value associated with execution flow of the instructions fetched by the microcontroller;

a program counter predictor unit configured to predict a next program counter value of a next instruction to be fetched; and an interrupt module configured to respond when the next instruction fetched by the microcontroller does not match the predicted next program counter value, wherein the comparison of the determined program counter value and the predicted next program counter value is performed in hardware at a different location from a main microprocessor and the microcontroller.

3. The execution flow protection module of claim 2, further comprising:

at least one last-in-first-out structure configured to handle subfunction call next instructions, wherein the program counter value is stored in the last-in-first-out structure during subfunction calls.

4. The execution flow protection module of claim 3, wherein during a subfunction call, the program counter value is a return address value of the next instruction.

5. The execution flow protection module of claim 2, further comprising:

one or more registers configured to receive a hint of the execution flow of the next instruction fetched.

6. The execution flow protection module of claim 5, wherein the program counter predictor unit is configured to predict the program counter value based on the hint.

7. The execution flow protection module of claim 5, wherein the hint provides an instruction to the one or more registers.

8. The execution flow protection module of claim 7, wherein the instruction to the one or more registers is representative of the execution flow of the next fetched instruction.

9. The execution flow protection module of claim 7, wherein the program counter predictor unit is configured to predict the program counter value based on the instruction provided to the register.

10. The execution flow protection module of claim 2, wherein the instruction decoder unit is configured to determine the program counter value of the next fetched instruction.

11. The execution flow protection module of claim 2, wherein the execution flow is a linear flow.

12. The execution flow protection module of claim 11, wherein the predicted program counter value is the address of the next fetched instruction.

13. The execution flow protection module of claim 2, further comprising:

at least one additional last-in-first-out structure for handling different modes or contexts of the microcontroller configured to provide and receive program counter values when a function call or return is detected by the instruction decoder.

14. The execution flow protection module of claim 2, wherein the execution flow is a conditional branch.

15. The execution flow protection module of claim 2, wherein one or more registers are configured to receive two hints of the execution flow of the next instruction fetched.

16. The execution flow protection module of claim 15, wherein the first hint can be used to set a canary value and a second hint can enable performance of a comparison.

17. An integrated circuit comprising:
the microprocessor;
the memory; and
the execution flow protection module according to claim 2.

18. A secure device comprising the microcontroller according to claim 17, the secure device being a smart card.

* * * * *